(12) United States Patent
Kurumisawa et al.

(10) Patent No.: US 9,061,590 B2
(45) Date of Patent: Jun. 23, 2015

(54) LEADING VEHICLE DETECTING APPARATUS AND INTER-VEHICULAR CONTROL APPARATUS USING LEADING VEHICLE DETECTING APPARATUS

(71) Applicant: DENSO CORPORATION, Kariya, Aichi-pref. (JP)

(72) Inventors: Jin Kurumisawa, Kariya (JP); Tatsuya Namikiri, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/713,087

(22) Filed: Dec. 13, 2012

(65) Prior Publication Data
US 2013/0158830 A1  Jun. 20, 2013

(30) Foreign Application Priority Data

Dec. 14, 2011  (JP) ................................ 2011-273584

(51) Int. Cl.
*B60K 31/00* (2006.01)
*B60W 30/16* (2012.01)
*B60W 10/06* (2006.01)
*B60W 10/18* (2012.01)

(52) U.S. Cl.
CPC ............... *B60K 31/00* (2013.01); *B60W 10/06* (2013.01); *B60W 10/18* (2013.01); *B60W 30/162* (2013.01); *B60W 2420/52* (2013.01); *B60W 2520/14* (2013.01); *B60W 2520/28* (2013.01); *B60W 2550/146* (2013.01)

(58) Field of Classification Search
USPC ........................................................ 701/96
See application file for complete search history.

(56) References Cited

U.S. PATENT DOCUMENTS

| 6,496,770 | B2 * | 12/2002 | Winner et al. .................. 701/96 |
| 6,670,910 | B2 * | 12/2003 | Delcheccolo et al. .......... 342/70 |
| 6,718,259 | B1 * | 4/2004 | Khosla ........................... 701/536 |
| 6,763,904 | B2 * | 7/2004 | Winner et al. ................ 180/167 |
| 6,789,015 | B2 * | 9/2004 | Tsuji et al. .................... 701/301 |

(Continued)

FOREIGN PATENT DOCUMENTS

| JP | 2006-133956 | 5/2006 |
| JP | 2008-269007 | 11/2008 |

OTHER PUBLICATIONS

Office Action issued Nov. 12, 2013 in corresponding JP Application No. 2011-273584 (with English translation).

*Primary Examiner* — Yonel Beaulieu
*Assistant Examiner* — Krishnan Ramesh
(74) *Attorney, Agent, or Firm* — Harness, Dickey & Pierce, PLC

(57) ABSTRACT

A leading vehicle detecting apparatus judges whether or not a first vehicle is following a second vehicle. The apparatus includes a signal acquiring section, a storage section, and calculating section. The signal acquiring section acquires position signals outputted from a position detecting section that detects the position of the second vehicle, and detection signals outputted from a state detecting section that detects a state of a first vehicle cruising line. The storage section stores in advance a probability map showing the probability of the first vehicle following the second vehicle, based on a distance between an expected cruising line of the first vehicle and the position of the second vehicle. The calculating section calculates the expected cruising line based on the detection signals, and judges whether the first vehicle is following the second vehicle based on the expected cruising line, position signals, and probability map.

10 Claims, 11 Drawing Sheets

(56) References Cited

U.S. PATENT DOCUMENTS

| | | | |
|---|---|---|---|
| 6,927,699 B2 * | 8/2005 | Samukawa et al. | 340/903 |
| 6,941,216 B2 * | 9/2005 | Isogai et al. | 701/96 |
| 7,030,775 B2 * | 4/2006 | Sekiguchi | 340/903 |
| 7,991,526 B2 * | 8/2011 | Lehre et al. | 701/36 |
| 8,098,889 B2 * | 1/2012 | Zhu et al. | 382/103 |
| 8,112,223 B2 * | 2/2012 | Jordan et al. | 701/300 |
| 8,131,444 B2 * | 3/2012 | Urban et al. | 701/96 |
| 8,396,655 B2 * | 3/2013 | Breuer et al. | 701/408 |
| 2003/0070851 A1 * | 4/2003 | Winner et al. | 180/167 |
| 2005/0010351 A1 * | 1/2005 | Wagner et al. | 701/96 |
| 2006/0136132 A1 | 6/2006 | Sawamoto | |
| 2008/0288150 A1 * | 11/2008 | Isogai et al. | 701/70 |
| 2009/0055095 A1 * | 2/2009 | Urban et al. | 701/301 |
| 2010/0017180 A1 * | 1/2010 | Randler et al. | 703/8 |
| 2012/0053755 A1 * | 3/2012 | Takagi | 701/1 |

* cited by examiner

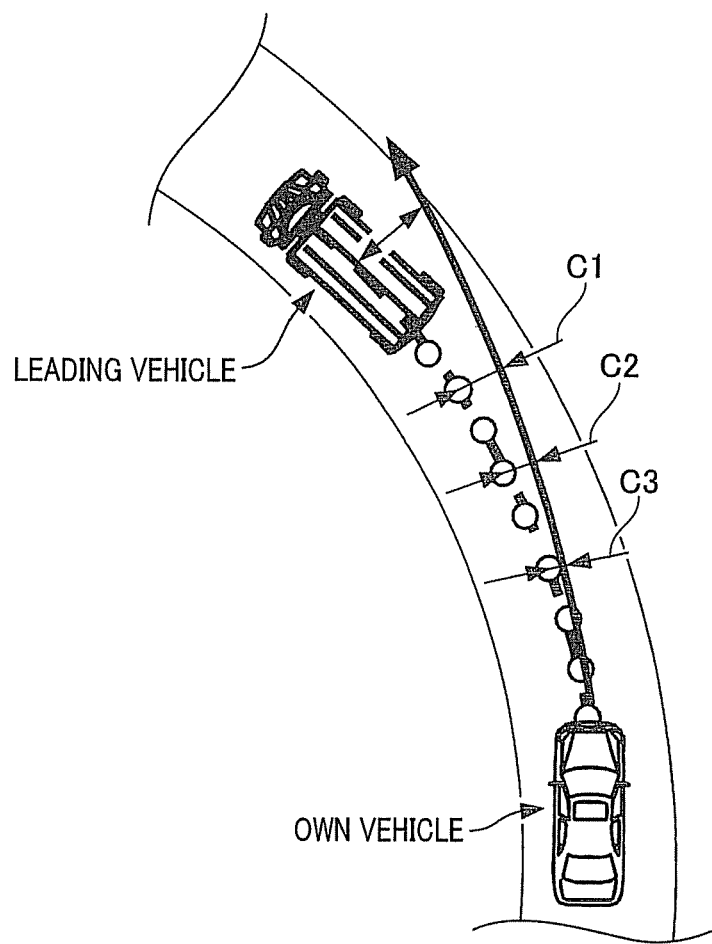

LEADING VEHICLE DETECTING APPARATUS AND INTER-VEHICULAR CONTROL APPARATUS USING LEADING VEHICLE DETECTING APPARATUS

This application is based on and claims the benefit of priority from earlier Japanese Patent Application No. 2011-273584 filed Dec. 14, 2011, the description of which is incorporated herein by reference.

BACKGROUND OF THE INVENTION

1. Field of the Invention

The present invention relates to a leading vehicle detecting apparatus and an inter-vehicular control apparatus using the leading vehicle detecting apparatus. To put it in concrete terms, the leading is vehicle detecting apparatus and the inter-vehicular control apparatus may be mounted in a vehicle including an adaptive cruise control (ACC) system. The inter-vehicular control may be executed by using an inter-vehicular controller therein. The ACC system controls the inter-vehicular distance between the own vehicle and a leading vehicle when the own vehicle is traveling such as to follow a leading vehicle (a vehicle traveling directly in front of the own vehicle) traveling in the same traffic lane as the own vehicle, among the vehicles (preceding vehicles) traveling ahead of the own vehicle.

2. Description of the Related Art

In recent years, vehicles are being provided that include ACC system as a system for reducing driving load placed on drivers. The ACC system automatically controls the traveling speed of the vehicle to a set speed, and automatically controls the inter-vehicular distance between the own vehicle and a leading vehicle traveling ahead of the vehicle to a predetermined distance. In other words, when the speed of the leading vehicle is slower than the set speed, the ACC system performs control to operate the brakes or the like and decelerate the own vehicle to ensure the predetermined inter-vehicular distance. When the leading vehicle moves further ahead, the ACC system performs control to accelerate the own vehicle to the set speed.

In a technology, such as that described above, for controlling the distance from the leading vehicle, a judgment is required to be made regarding whether or not the leading vehicle is a suitable candidate to be followed. As a technology for making such judgments, a technology is known in which the probability of a vehicle traveling ahead of the own vehicle being suitable to be a leading vehicle is calculated by a traffic lane probability map, using relative positions of the own vehicle and the leading vehicle, and a presumed course (presumed cruising track) of the own vehicle. The judgment is then made based on the calculated probability (refer to, for example, JP-A-2008-269007).

However, a difference may occur in the presumed course of the own vehicle and the course of the leading vehicle on, for example, a curved road because of the difference in the positions of the own vehicle and the leading vehicle on the curved road on which they are traveling. In this instance, in the technology described in JP-A-2008-269007, the probability of a judgment being made that the vehicle traveling ahead of the own vehicle is the leading vehicle is low. Even when the vehicle is the leading vehicle that is traveling in the traffic lane (referred to, hereinafter, as a "cruising lane") in which the own vehicle is traveling, a judgment is likely to be erroneously made that the vehicle is not the leading vehicle. When such erroneous judgment is made, the own vehicle accelerates regardless of the leading vehicle being present, thereby causing the driver of the own vehicle to experience discomfort regarding the movement of the vehicle.

Conversely, on a curved road or the like, a judgment may be erroneously made that a vehicle traveling in a traffic lane other than the current lane, such as a traffic lane adjacent to the cruising lane, is the leading vehicle. When such erroneous judgment is made, the own vehicle excessively decelerates regardless of a leading vehicle not being present, thereby causing the driver to experience discomfort regarding the movement of the vehicle in a manner similar to that described above.

As a method of judging, without error, whether or not a vehicle traveling ahead of the own vehicle on a curved road and the like is a leading vehicle to be followed, a method is known in which the judgment is made regarding whether or not the vehicle is the leading vehicle at a position near the own vehicle. However, when the position at which the judgment is made is placed nearer to the own vehicle, leeway in terms of time for performing speed control of the own vehicle after the judgment becomes small. Therefore, gradual deceleration becomes difficult, and passengers in the own vehicle may experience discomfort. In other words, a problem occurs in that achieving both improved judgment accuracy regarding a leading vehicle and gradual deceleration of the own vehicle becomes difficult.

Hence, a leading vehicle detecting apparatus and an inter-vehicular control apparatus using the leading vehicle detecting apparatus capable of suppressing delay in judgment timing regarding a judgment of whether or not an own vehicle is following a preceding vehicle traveling in a same traffic lane as the own vehicle, while maintaining judgment accuracy, is desired.

SUMMARY

To solve the above-described subject, the present application, as an exemplary embodiment of the leading vehicle detecting apparatus, presents a leading vehicle detecting apparatus which is to be mounted in vehicles, and judges whether or not the own vehicle is traveling such as to follow a vehicle traveling ahead of the own vehicle in a same traffic lane. To put it in concrete terms, the leading vehicle detecting apparatus includes: a signal acquiring section that acquires a position signal outputted form a position detecting section that detects the position of the leading vehicle and a detected signal outputted from a state detecting section that detects the state regarding a cruising line of the own vehicle; a storage section that stores in advance a probability map that assigns a probability (following probability) regarding whether or not the own vehicle is following the leading vehicle on the basis of a distance between an expected cruising line of the own vehicle and the position of the leading vehicle; and a calculating section that calculates the expected cruising line on the basis of the detection signal, and judges whether or not the own vehicle is following the leading vehicle on the basis of the calculated expected cruising line, the position signal, and the probability map.

In addition, to solve the above-described subject, the present application, as an exemplary embodiment of an inter-vehicular control apparatus, presents an inter-vehicular control apparatus which is to be mounted in vehicles, and controls the distance between the own vehicle and a leading vehicle, when the own vehicle is following the leading vehicle traveling in the same traffic lane as the own vehicle, among the vehicles traveling ahead of the own vehicle. To put it in concrete terms, the inter-vehicular control apparatus includes: i) the above-described leading vehicle detecting apparatus; and ii) a control section that controls the inter-vehicular distance to be within a predetermined range by controlling the traveling speed of the own vehicle based on the inter-vehicular distance from the leading vehicle that the leading vehicle detecting apparatus has judged the own vehicle to be following, to the own vehicle.

BRIEF DESCRIPTION OF THE DRAWINGS

FIG. 9 is a schematic diagram for describing comparison positions determining the follow probability;

DETAILED DESCRIPTION OF THE PREFERRED EMBODIMENTS

Figure 1:
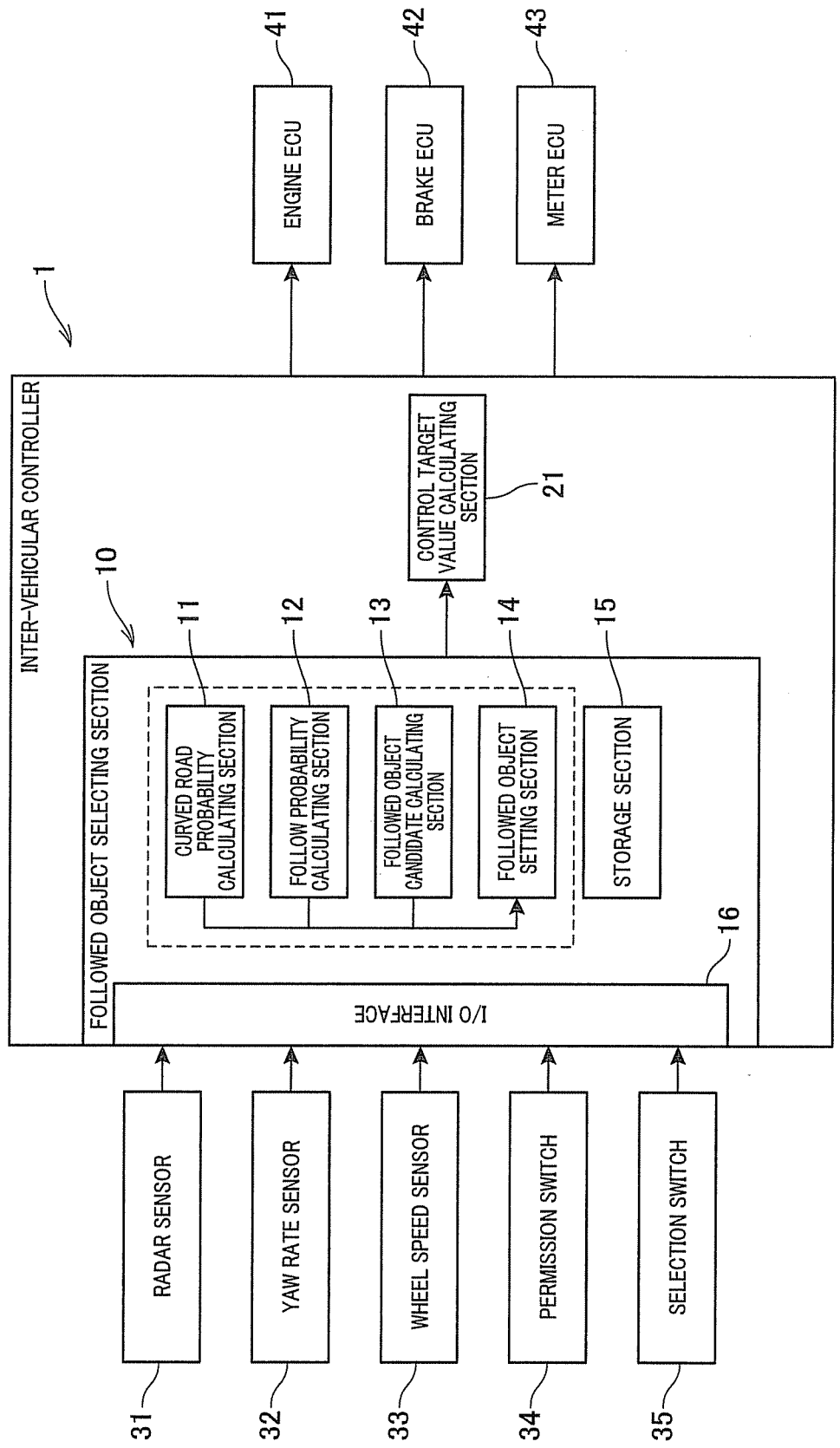
FIG. 1 is a schematic diagram for describing a configuration of an inter-vehicular controller according to an embodiment of the present invention.

An inter-vehicular controller 1 ("inter-vehicular control apparatus" in claims) according to an embodiment of the present invention will be described with reference to FIG. 1 to FIG. 12. FIG. 1 is a schematic diagram for describing a configuration of the inter-vehicular controller 1 according to the present embodiment.

The inter-vehicular controller 1 according to the present embodiment is mounted in a vehicle including an ACC system. The ACC system controls the inter-vehicular distance between the own vehicle and a leading vehicle when the own vehicle is traveling such as to follow a leading vehicle (a vehicle traveling directly in front of the own vehicle) traveling in the same traffic lane as the own vehicle, among the vehicles (preceding vehicles) traveling ahead of the own vehicle.

As shown in FIG. 1, the inter-vehicular controller 1 mainly includes a followed object selecting section 10 ("leading vehicle detecting apparatus" in claims) and a control target value calculating section 21 ("control section" in claims). The followed object selecting section 10 judges whether or not the own vehicle is following the leading vehicle. The control target value calculating section 21 performs control of the inter-vehicular distance between the own vehicle and the leading vehicle.

The followed object selecting section 10 mainly includes a curved road probability calculating section (calculating section) 11, a follow probability calculating section (calculating section) 12, a followed object candidate calculating section (calculating section) 13, a followed object setting section (calculating section) 14, (calculating sections 11 to 14 are described as "calculating section" in the claims), a storage section 15 ("storage section" in the claims), and an input/output (I/O) interface 16 ("signal acquiring section" in the claims).

The curved road probability calculating section 11 estimates, by calculation, the curvature of a curved road present ahead of the own vehicle and a change rate of the curvature. The curved road probability calculating section 11 also estimates, by calculation, the probability of the presence of a curved road ahead of the own vehicle.

The followed object candidate calculating section 13 selects, by calculation, a leading vehicle that is a followed object candidate among detected objects present ahead of the own vehicle detected by a radar sensor 31. The follow probability calculating section 12 determines, by calculation, the probability (follow probability) of the own vehicle following the leading vehicle selected as the followed object candidate.

The followed object setting section 14 judges whether or not the own vehicle is following the leading vehicle that is the followed object based on the follow probability determined by calculation by the follow probability calculating section 12. When judged that the own vehicle is following the leading vehicle, the followed object setting section 14 sets the leading vehicle as the followed object.

Specific details of processing performed by the above-described curved road probability calculating section 11, follow probability calculating section 12, followed object candidate calculating section 13, and followed object setting section 14 will be described in the description of control performed by the inter-vehicular controller 1.

According to the present embodiment, the present invention is applied to an example in which the curved road probability calculating section 11, the follow probability calculating section 12, the followed object candidate calculating section 13, and the followed object setting section 14 are independently provided. However, the functions of the plurality of calculating sections and the like may be actualized by a single calculating section. The number of calculating sections provided is not limited.

The storage section 15 stores in advance therein computer programs used for calculation processing performed by the above-described curved road probability calculating section 11, follow probability calculating section 12, followed object candidate calculating section 13, and followed object setting section 14, as well as pieces of information such as data and tables required for performing the processing. For example, the storage section 15 stores therein a probability map used in calculation processing for determining the follow probability performed by the follow probability calculating section 12.

Signals outputted from the radar sensor 31 and the like are inputted into the I/O interface 16. The I/O interface 16 is configured such that signals are respectively inputted from the radar sensor 31 ("position detecting section" in claims), a yaw rate sensor 32 (state detecting section), a wheel speed sensor 33, a permission switch 34, and a selection switch 35. The radar sensor 31 is a scan-type sensor that detects the position of the leading vehicle traveling ahead of the own vehicle and the like. The yaw rate sensor 32 detects the speed at which a rotation angle changes to a steering direction in the own vehicle. The wheel speed sensor 33 detects the traveling speed of the own vehicle by detecting a rotation speed of the wheels of the own vehicle. The permission switch 34 inputs whether or not permission is granted for control by the inter-vehicular controller 1. The selection switch 35 performs selection of control mode of the inter-vehicular controller 1. The yaw rate sensor 32 and the wheel speed sensor 33 are equivalent to a "state detecting section" in claims.

According to the present embodiment, the present invention is applied to an example in which the radar sensor 31 uses millimeter waveband radio waves. However, a scan-type laser radar (or light detection and ranging [LIDAR]) using laser light in addition to or instead of radio waves may be used. The type of sensor is not particularly limited. In addition, known sensors can be used as the yaw rate sensor 32 and the wheel speed sensor 33. The type of sensor and the detection method are not particular limited thereto.

The control target value calculating section 31 controls the traveling speed of the own vehicle, thereby maintaining the inter-vehicular distance between the leading vehicle, set by the followed object selecting section 10, and the own vehicle at a suitable interval set in advance. More specifically, the control target value calculating section 21 determines, by calculation, the control target value for engine output from an engine control unit (engine ECU) 41, the control target value for brake operation by a brake control unit (brake ECU) 42, and the like, and generates control signals to be outputted to the engine ECU 41 and the brake ECU 42.

Next, control of the inter-vehicle distance between the own vehicle and the leading vehicle, and leading vehicle selection correction processing performed by the inter-vehicular controller 1 according to the present embodiment will be described with reference to FIG. 2 to FIG. 11. The leading vehicle selection correction processing is performed when a leading vehicle to be subjected to inter-vehicular distance control is selected or when selection is continued, and configures a portion of the inter-vehicular distance control.

Figure 2:
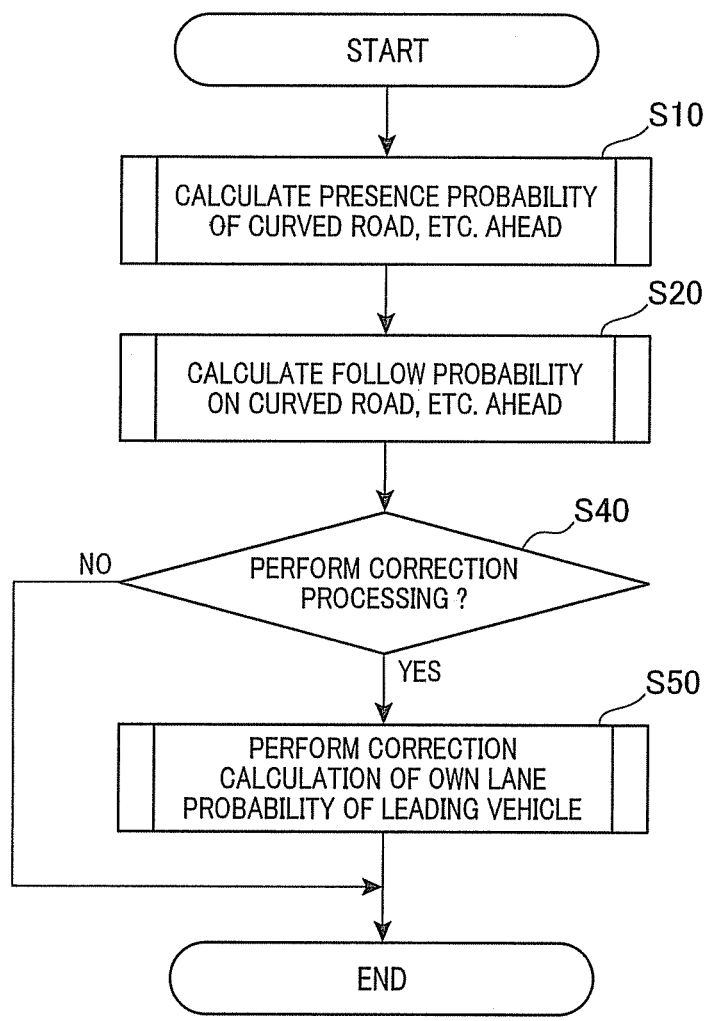
FIG. 2 is a flowchart for describing leading vehicle selection correction processing performed by a followed object selecting section in FIG. 1.

First, the leading vehicle selection correction processing performed by the followed object selecting section 10 of the inter-vehicular controller 1 will be described. When the driver of the own car uses the ACC system and starts control for leaving a predetermined inter-vehicular interval behind a leading vehicle and automatically following the leading vehicle at the predetermined traveling speed, the followed object selecting section 10 of the inter-vehicular controller 1 starts calculation processing for determining the probability of the presence of a curved road or the like ahead of the own vehicle (S10), as shown in FIG. 2. Here, the curved road or the like refers to a road including the traffic lane in which the own vehicle is traveling, and also includes a curved road having a predetermined curvature, a straight road having an infinite curvature, and the like.

As the calculation processing for determining the probability of the presence of a curved road or the like, calculation processing based on a detection signal related to the state ahead of the own vehicle outputted from the radar sensor 31 (see FIG. 3), calculation processing based on the trajectory of the leading vehicle (see FIG. 4), and calculation processing based on a detection signal outputted from the yaw rate sensor 32 (see FIG. 5) are performed. Each calculation processing will be described hereafter.

Figure 3:
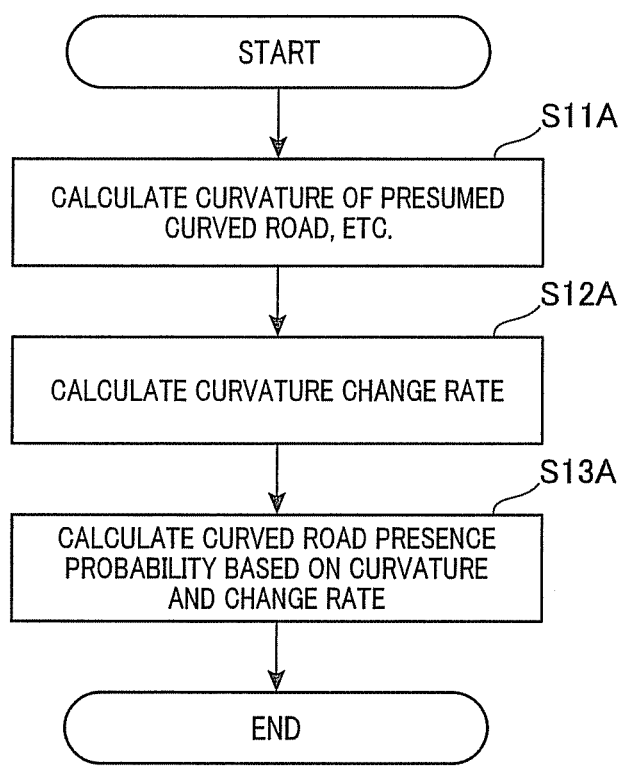
FIG. 3 is a flowchart for describing calculation processing for determining a presence probability of a curved road and the like by using a radar sensor.

First, the calculation processing for determining a presence probability $P_{Sns}$ of the presence of a curved road or the like, based on the detection signal related to the state ahead of the own vehicle outputted from the radar sensor 31, will be described with reference to FIG. 3.

The curved road probability calculating section 11 of the followed object selecting section 10 performs calculation processing for detecting the curved road and or the like present ahead of the own vehicle, on the basis of the detection signal from the radar sensor 31, and determines, by calculation processing, the curvature of the presumed curved road or the like determined by calculation (S11A).

When the curvature of the presumed curved road or the like is calculated, the curved road probability calculating section 11 determines, by calculation processing, the change rate of the curvature based on the calculated curvature (S12A). Next, the curved road probability calculating section 11 performs calculation processing for determining the presence probability $P_{Sns}$ that is the probability of the presence of a curved road ahead of the own vehicle based on the calculated curvature and change rate of the curvature (Step S13A). The presence probability $P_{Sns}$ determined by calculation is stored in the storage section 15. As a result, the calculation processing for determining the presence probability $P_{Sns}$ of the curved road or the like by the radar sensor 31 is completed.

Figure 4:
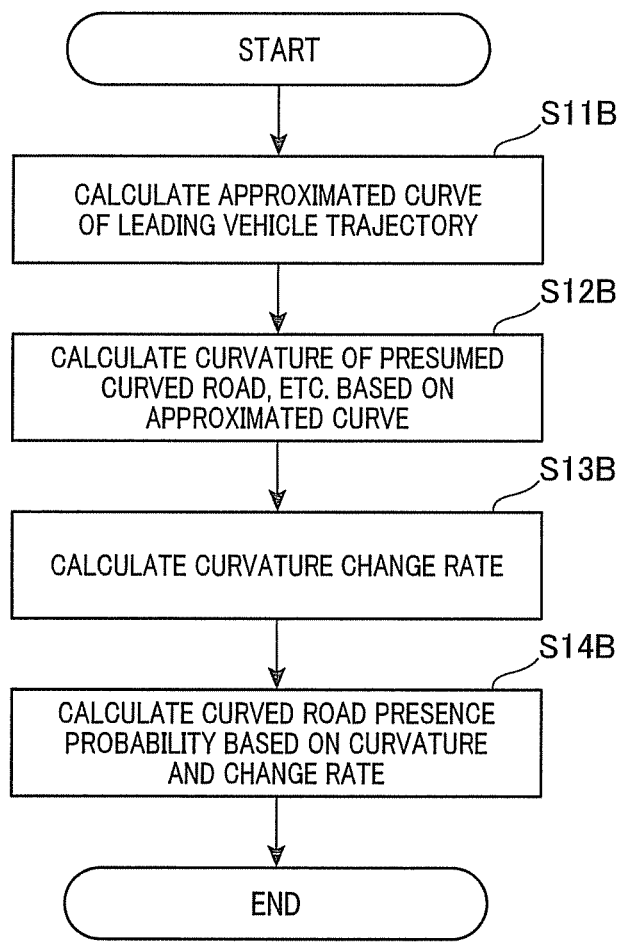
FIG. 4 is a flowchart for describing calculation processing for determining a presence probability of a curved road and the like by using a trajectory of the leading vehicle.

Next, the calculation processing for determining a presence probability $P_{Traj}$ of the presence of a curved road or the like based on the trajectory of the leading vehicle will be described, with reference to FIG. 4. The curved road probability calculating section 11 determines, by calculation processing, an approximated curve of the trajectory of the leading vehicle based on the detection signals from the radar sensor 31 related to the leading vehicle stored in the storage section 15 (S11B). In other words, the curved road probability calculating section 11 determines a trajectory indicating the positions of the leading vehicle at a plurality of different points in time within a predetermined period, based on a plurality of detection signals at differing elapsed times from detection by the radar sensor 31. The curved road probability calculating section 11 then determines, by calculation, the approximated curve based on the trajectory. The approximated curve is merely required to be a curve having the shortest distance from the trajectory of the leading vehicle. The method of determining the approximated curve is not limited.

The curved road probability calculating section 11 then performs calculation processing for determining the curvature of the presumed curved road or the like based on the determined approximated curve (S12B). Here, the determined approximated curve is considered to represent the shape of the presumed curved road or the like. Next, the curved road probability calculating section 11 performs calculation processing for determining the change rate of curvature based on the determined curvature of the presumed curved road or the like (S13B).

Furthermore, the curved road probability calculating section 11 performs calculation processing for determining the presence probability $P_{Traj}$ that is the probability of the presence of a curved road ahead of the own vehicle based on the calculated curvature and change rate of the curvature (S14B). The presence probability $P_{Traj}$ determined by calculation is stored in the storage section 15. As a result, the calculation processing for determining the presence probability $P_{Traj}$ of the curved road or the like based on the trajectory of the leading vehicle is completed.

Figure 5:
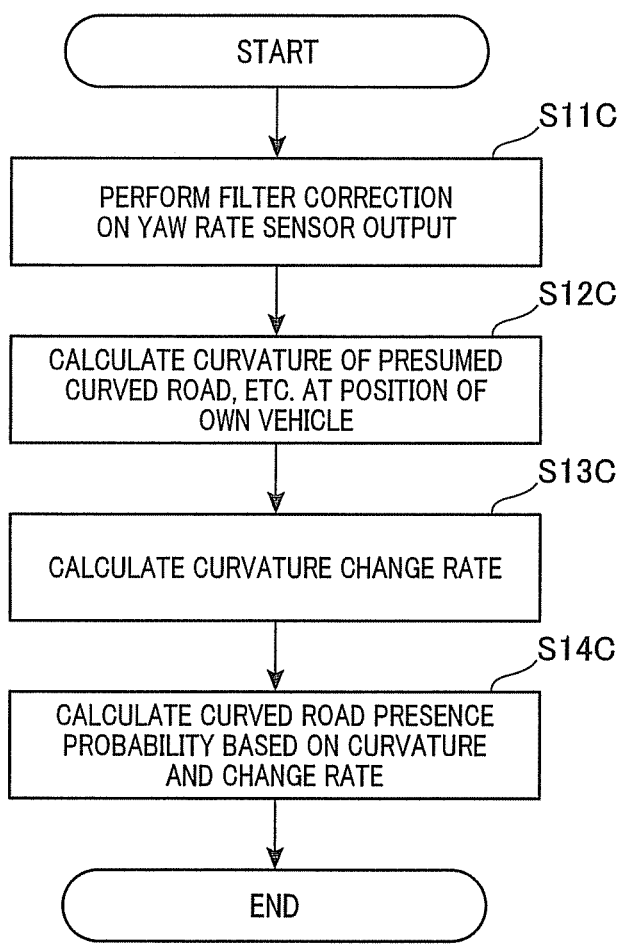
FIG. 5 is a flowchart for describing calculation processing for determining a presence probability of a curved road and the like by using a yaw rate sensor.

Finally, the calculation processing for determining a presence probability $P_{Yaw}$ of the presence of a curved road or the like based on the yaw rate of the own vehicle will be described, with reference to FIG. 5. The curved road probability calculating section 11 performs filter correction processing for removing noise, which is unnecessary signals and the like, on the detection signals outputted from the yaw rate sensor 32 that detects the yaw rate of the own vehicle (S11C). When filter correction of the detection signals for yaw rate is completed, the curved road probability calculating section 11 performs calculation processing for determining the curvature of the presumed curved road or the like at the position of the own vehicle (S12C). Specifically, the curved road probability calculating section 11 performs calculation processing for estimating the curved road or the like ahead of the own vehicle based on the detection signals for yaw rate. The curved road probability calculating section 11 then performs calculation processing for determining the curvature of the determined presumed curved road or the like.

When the curvature of the presumed curved road or the like is determined, the curved road probability calculating section 11 performs calculation processing for determining the change rate of curvature based on the determined curvature (S13C). Then, the curved road probability calculating section 11 performs calculation processing for determining the presence probability $P_{Yaw}$ that is the probability of the presence of a curved road ahead of the own vehicle based on the calculated curvature and change rate of the curvature (S14C). The presence probability $P_{Yaw}$ determined by calculation is stored in the storage section 15. As a result, the calculation processing for determining the presence probability $P_{Yaw}$ of the curved road or the like based on the yaw rate of the own vehicle is completed.

When the calculation processing for determining the presence probability of a curved road or the like is completed, the followed object selecting section 10 returns to the operations in FIG. 2 and performs calculation processing for determining the follow probability on the curved road or the like ahead (S20). Specifically, the follow probability calculating section 12 performs calculation processing for determining the follow probability in adherence to the flowchart shown in FIG. 6.

In other words, the follow probability calculating section 12 performs processing for maintaining past positions of the leading vehicle selected by the followed object candidate calculating section 13, and the traveling speed and the value of yaw rate of the own vehicle (S21). The past positions of the leading vehicle are the detection signals from the radar sensor 31 or positional information of the leading vehicle determined by calculation from the detection signals. The past positions of the leading vehicle have been inputted into the followed object selecting section 10 at a plurality of past points in time, and are temporarily stored in the storage section 15 or the like. The traveling speed of the own vehicle is the detection signal from the wheel speed sensor 33 or information on the traveling speed of the own vehicle determined by calculation from the detection signal. The yaw rate is the detection signal from the yaw rate sensor 32 or information on the yaw rate of the own vehicle determined by calculation from the detection signal.

The follow probability calculating section 12 then performs calculation processing for determining a cruising track of the leading vehicle (S22). Specifically, the follow probability calculating section 12 performs the calculation processing for determining the cruising tracks of the preceding vehicles in adherence to the flowchart shown in FIG. 7.

First, the follow probability calculating section 12 performs calculation to determine the preceding vehicle trajectory on an own vehicle coordinate system (S31). Here, the own vehicle coordinate system refers to a coordinate system that is unchanging in relation to the own vehicle, of which the point of origin is placed at an arbitrary position in the own vehicle. A rectangular coordinate system of which the point of origin is placed at the center front end of the own vehicle is ordinarily used. In other words, the follow probability calculating section 12 performs calculation to determine changes over time in the relative position of the preceding vehicle with reference to the own vehicle, based on the detection signals from the radar sensor 31.

Next, the follow probability calculating section 12 performs calculation processing for determining the cruising track of the own vehicle on a ground coordinate system (S32). Here, the ground coordinate system refers to a coordinate system that is unchanging in relation to the ground, of which the point of origin is placed at an arbitrary position. A rectangular coordinate system that is unchanging in relation to the ground is ordinarily used. In other words, the follow probability calculating section 12 performs calculation to determine changes over time in the position of the own vehicle in relation to the ground, based on the detection signals from the wheel speed sensor 33 and the detection signals from the yaw rate sensor 32.

The follow probability calculating section 12 then performs calculation processing for determining the cruising track of the leading vehicle on the ground coordinate system (S33). In other words, the follow probability calculating section 12 performs calculating processing for converting the leading vehicle trajectory on the own vehicle coordinate system determined in the processing at S32 to the cruising track of the leading vehicle on the ground coordinate system, based on the cruising track of the own vehicle on the ground coordinate system determined in the processing at S32.

Figure 8:
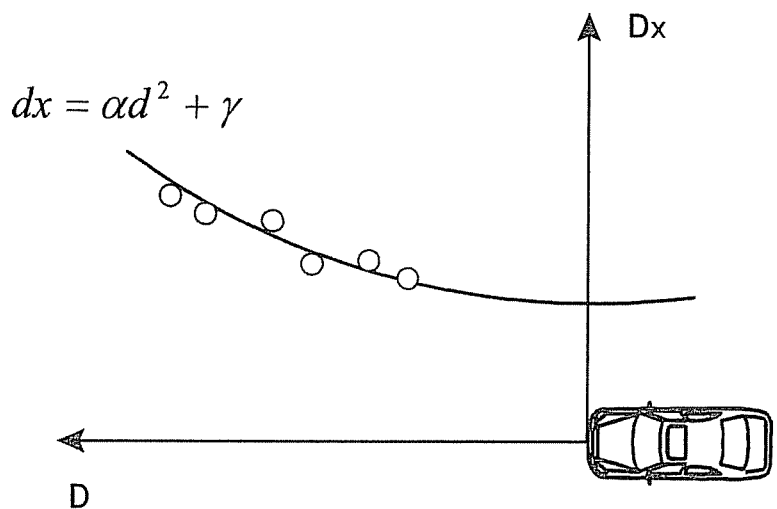
FIG. 8 is a schematic diagram for describing calculation processing for determining an approximated curve of the cruising track of the preceding vehicle.

Finally, the follow probability calculating section 12 performs calculation processing for determining the approximated curve of the leading vehicle cruising track determined in the processing at S33 (S34). Specifically, as shown in FIG. 8, the follow probability calculating section 12 determines the approximated curve of the cruising track of the leading vehicle using a least-squares method. The white circles in FIG. 8 indicate the cruising track of the leading vehicle. The solid line forming a gentle curve is the approximated curve. The approximated curve is a curve expressed by the following expression (1).

$$dx = \alpha d^2 + \gamma \quad (1)$$

where $\alpha$ and $\gamma$ are constants determined by the following expression (2) and expression (3).

[Formula 1]

$$\alpha = \frac{n \sum_{i=1}^{n} Dx_i D_i^2 - \sum_{i=1}^{n} D_i^2 \sum_{i=1}^{n} Dx_i}{n \sum_{i=1}^{n} D_i^4 - \left(\sum_{i=1}^{n} D_i^2\right)^2} \quad (2)$$

$$\gamma = \frac{\sum_{i=1}^{n} Dx_i - \alpha \sum_{i=1}^{n} D_i^2}{n} \quad (3)$$

where n is a natural number determined based on the number of cruising tracks of the leading vehicle.

Figure 6:
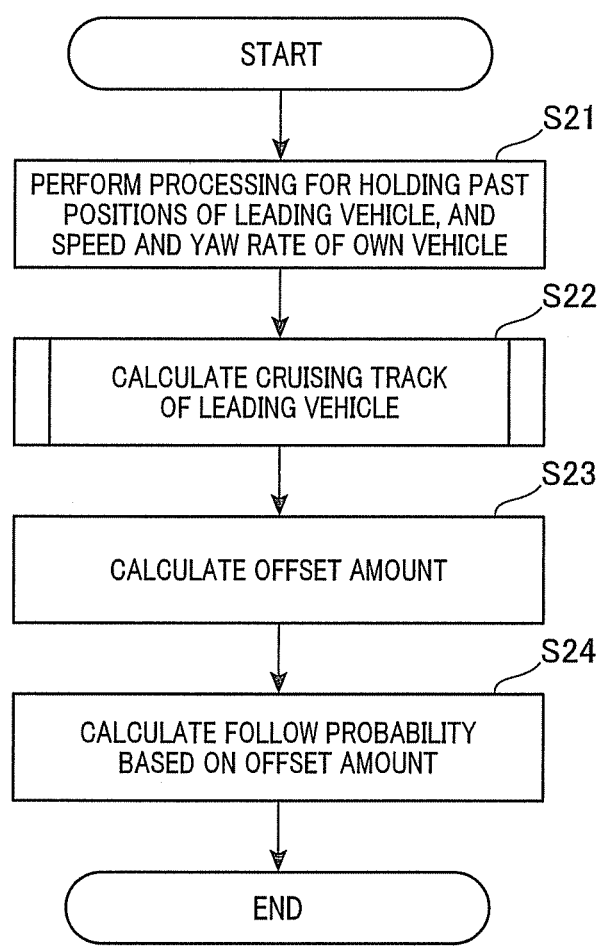
FIG. 6 is a flowchart for describing calculation processing for determining a follow probability regarding a preceding vehicle.
Figure 7:
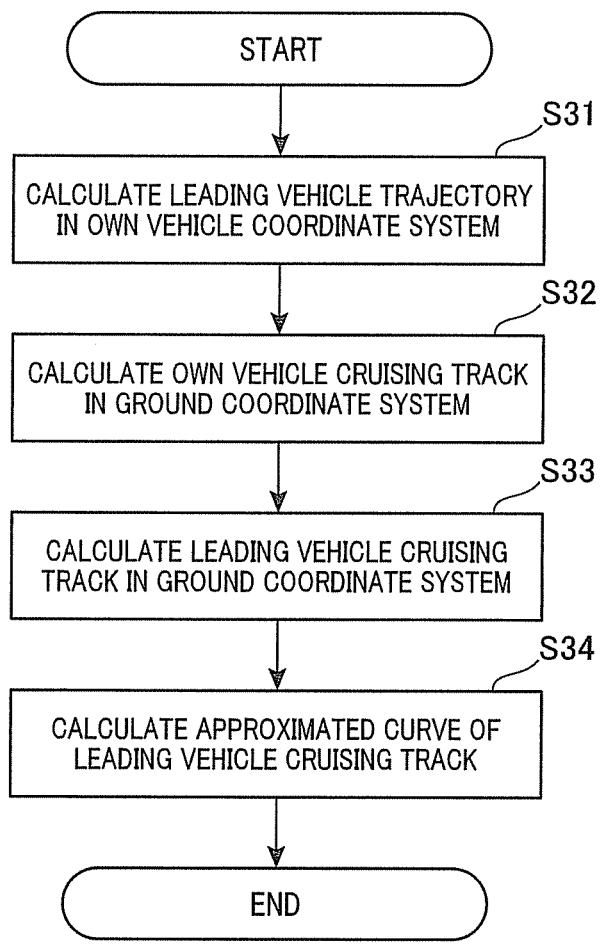
FIG. 7 is a flowchart for describing calculation processing for determining a cruising track of the preceding vehicle.

When the calculation processing for determining the approximated curve of the leading vehicle cruising track is completed, the follow probability calculating section 12 returns to the flowchart shown in FIG. 6 and performs calculation processing for determining an offset amount between an expected cruising line of the own vehicle and the cruising track of the leading vehicle (S23).

The expected cruising line of the own vehicle is a line on which the own vehicle is expected to travel. The expected cruising line is a curve determined by calculation processing performed by the follow probability calculating section 12 based on the detection signals from the yaw rate sensor 32 and the detection signals from the wheel speed sensor 33. The curve is preferably determined as a transition curve and more preferably determined as a clothoid curve among the transition curves. The offset amount is the shortest distance between the expected cruising line and the approximated curve of the leading vehicle cruising track at a predetermined position between the own vehicle and the leading vehicle, or in other words, the amount of misalignment in the lateral direction in relation to the vehicle traveling direction.

When the offset amount is determined, the follow probability calculating section 12 performs calculation processing for determining a follow probability based on the determined offset amount and the probability map (S24). According to the present embodiment, first, the follow probability calculating section 12 determines the follow probability at each of three comparison positions C1 to C3 between the own vehicle and the leading vehicle, as shown in FIG. 9. The white circles in FIG. 9 indicate the cruising track of the leading vehicle. The dotted line indicates the approximated curve of the cruising track of the leading vehicle. The solid arrow indicates the expected cruising line.

Figure 10A:
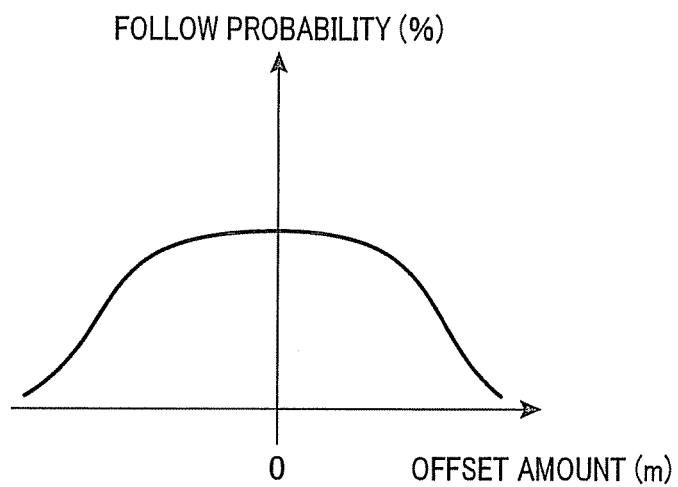
FIG. 10A to FIG. 10C are diagrams for describing a probability map stored in a storage section in advance.
Figure 10B:
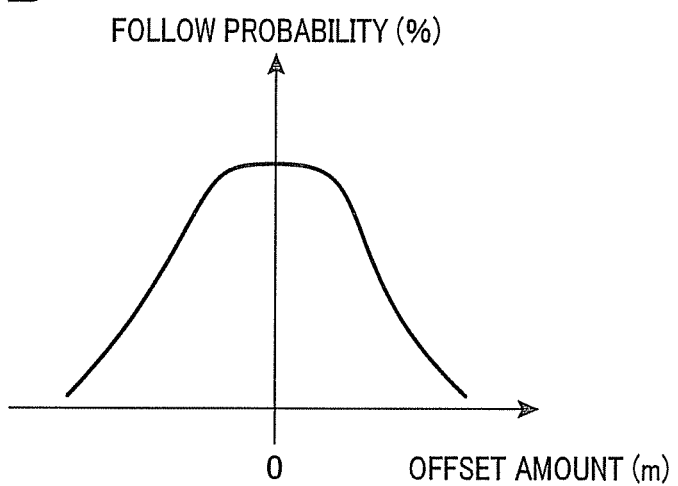
Figure 10C:
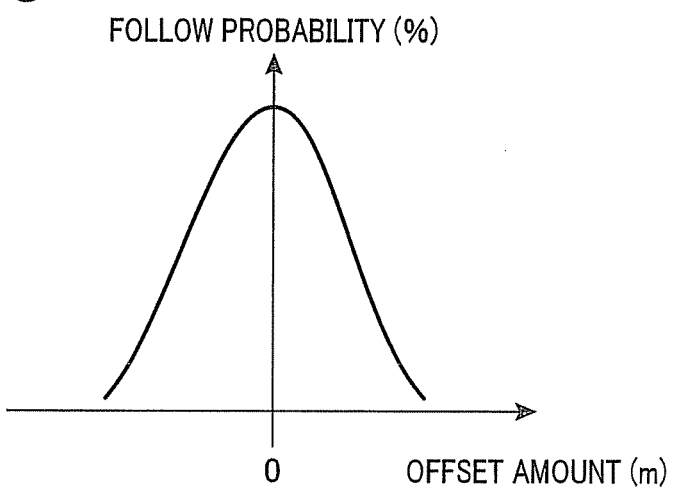

The probability map is stored in advance in the storage section 15. As shown in FIG. 10A to FIG. 10C, the probability map is a map in which correspondence between the offset amount and the follow probability is set. The follow probability refers to the probability of the own vehicle following the leading vehicle selected by the followed object candidate calculating section 13, or in other words, the probability of the leading vehicle selected by the followed object candidate calculating section 13 being the leading vehicle traveling in the same lane as the own vehicle. In general, the follow probability decreases as the offset amount increases. The follow probability increases as the offset amount decreases.

FIG. 10A is a diagram for describing the probability map at the comparison position C1. FIG. 10B is a diagram for describing the probability map at the comparison position C2. FIG. 10C is a diagram for describing the probability map at the comparison position C3. As shown in FIG. 10A to FIG. 10C, in the probability map, the follow probability when the offset amount is 0 m increases from the comparison position C1 far from the own vehicle toward the comparison position C3 near the own vehicle. In addition, the area in which the follow probability is high, or in other words, the range of the offset amount in each probability map also becomes narrower.

In other words, the probability maps reflect that, when the own vehicle is following the leading vehicle, the offset amount that is the error between the approximated curve of the cruising track of the leading vehicle and the expected cruising line becomes smaller as the comparison position becomes nearer to the own vehicle. Conversely, the probability maps reflect the error between the expected cruising line and the actual cruising lane, and reflect that the offset amount may decrease as the comparison position becomes far from the own vehicle, even when the own vehicle is following the leading vehicle.

According to the present embodiment, the present invention is applied to an example in which the probability map is created based on data collected in advance. As parameters (data) required for creating the probability map, for example, the traveling speed of the own vehicle, the traveling speed of the leading vehicle, the inter-vehicular distance between the own vehicle and the leading vehicle, the set value of the inter-vehicular distance, a presumed curve radius for the leading vehicle, and a presumed curve radius for the own vehicle are given.

In addition, according to the present embodiment, the present invention is applied to an example in which the follow probability is determined at three different comparison positions C1, C2, and C3. However, the position at which the follow probability is determined may be a single comparison position or a plurality of comparison positions. The number of comparison positions is not limited.

When the follow probability at each comparison position C1 to C3 is determined, the follow probability calculating section 12 performs calculation processing for determining an aggregated follow probability in which the follow probabilities are aggregated. Specifically, the aggregated follow probability $P_{follow}$ is calculated based on the following expression (4).

[Formula 2]

$$P_{follow} = \frac{P_1 \cdot P_2 \cdot P_3}{\{P_1 \cdot P_2 \cdot P_3 + (1-P_1) \cdot (1-P_2) \cdot (1-P_3)\}} \quad (4)$$

where $P_1$ represents the follow probability (estimate of the percentage) at the comparison position C1, $P_2$ represents the follow probability (estimate of the percentage) at the comparison position C2, and $P_3$ represents the follow probability (estimate of the percentage) at the comparison position C3.

When the calculation processing for determining the aggregated follow probability $P_{follow}$ is completed, the follow probability calculating section 12 returns to the flowchart in FIG. 2 and performs judgment processing of correction conditions to judge whether to start correction processing at S50 (Yes at S40), described hereafter, or end processing without starting the correction processing (No at S40).

The condition for starting the correction processing at S50 is that all of the following four conditions are met:
(Y1) the traveling speed of the own vehicle is a predetermined threshold value or higher;
(Y2) a leading vehicle is present;
(Y3) the amount of time over which the own vehicle is following the leading vehicle is a predetermined threshold value or higher; and
(Y4) the inter-vehicular distance between the own vehicle and the leading vehicle is set to a threshold value or higher.

The condition for ending the correction processing at S50 is that any of the following four conditions is met:
(N1) the traveling speed of the own vehicle is less than a predetermined threshold value;
(N2) a leading vehicle is not present;
(N3) the amount of time over which the own vehicle is following the leading vehicle is less than a predetermined threshold value; or
(N4) the inter-vehicular distance between the own vehicle and the leading vehicle is set to less than a threshold value.

When judged that at least one condition among above-described (N1) to (N2) is met, the processing at S50 is not performed, and the selection correction processing for the leading vehicle performed in the followed object selecting section 10 is completed.

Figure 11:
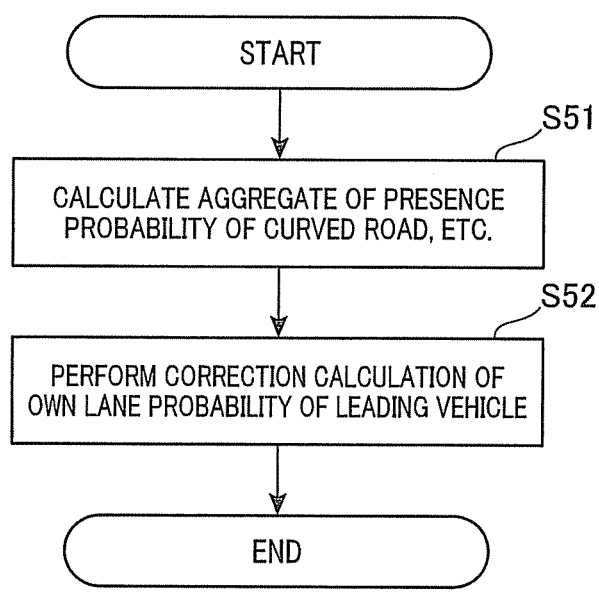
FIG. 11 is a schematic diagram for describing the effects of the inter-vehicular controller according to the present embodiment.

When judged that all of the above-described conditions (Y1) to to (Y4) are met, the follow probability calculating section 12 performs calculation processing for correcting an own lane probability of the leading vehicle (S50). Specifically, the follow probability calculating section 12 performs the calculation processing for correcting the own lane probability of the leading vehicle in adherence to the flowchart is shown in FIG. 11.

First, the follow probability calculating section 12 performs calculation processing for determining an aggregated presence probability $P_{Crv}$ that is the aggregated probability of the presence of a curved road or the like ahead of the own vehicle, based on the presence probabilities $P_{Sns}$, $P_{Traj}$, and $P_{Yaw}$ of the curved road or the like stored in the storage section 15 (S51).

[Formula 3]

$$P_{Crv} = \frac{P_{Sns} \cdot P_{Traj} \cdot P_{Yaw}}{\{P_{Sns} \cdot P_{Traj} \cdot P_{Yaw} + (1-P_{Sns}) \cdot (1-P_{Traj}) \cdot (1-P_{Yaw})\}} \quad (5)$$

When the aggregated presence probability $P_{Crv}$ is calculated, the follow probability calculating section 12 then performs correction calculation processing of the own lane probability (S52). Specifically, the follow probability calculating section 12 performs calculation processing for determining a corrected own lane probability $P_{Prob\#cmp}$ based on the aggregated presence probability $P_{Crv}$ determined at S51, the own lane probability $P_{Prob}$ before correction, the aggregated follow probability $P_{follow}$ determined at S24, and the following expression (6).

[Formula 4]

$$P_{Prob\_Cmp} = 100 \cdot (P_{Crv} \cdot P_{follow}) + P_{Prob} \cdot \{1-(P_{Crv} \cdot P_{follow})\} \quad (6)$$

When the corrected own lane probability $P_{Prob\#cmp}$ is determined, the follow probability calculating section 12 returns to the flowchart in FIG. 2, and the leading vehicle selection correction processing is completed.

The followed object setting section 14 judges whether or not the own vehicle is following the leading vehicle that is the followed object, based on the aggregated follow probability $P_{follow}$ determined by calculation. When judged that the own vehicle is following the leading vehicle, the followed object setting section 14 performs processing for is setting the leading vehicle as the object on which control of inter-vehicular distance is performed.

When the followed object is set, next, the control target value calculating section 31 performs control processing of the speed of the own vehicle to maintain the inter-vehicular distance between the leading vehicle and the own vehicle at the interval set in advance. For example, when the actual inter-vehicular distance is less than the set interval, the control target value calculating section 21 performs control processing to reduce the speed of the own vehicle to increase the inter-vehicular distance. Specifically, the control target value calculating section 21 generates a control signal for reducing engine output and outputs the generated control signal to the engine ECU 41. Alternatively, the control target value calculating section 21 generates a control signal to operate the brakes on the own vehicle and outputs the generated control signal to the brake ECU 42.

Conversely, when the traveling speed of the own vehicle is slow, and the inter-vehicular distance becomes greater than the set interval as a result of the leading vehicle moving away or the like, the control target value calculating section 21 performs processing to increase the speed of the own vehicle to return the traveling speed of the own vehicle to the original speed. Specifically, the control target value calculating section 21 generates a control signal for increasing the output of the engine and outputs the generated control signal to the engine ECU 41.

In concurrence with these control operations, the control target value calculating section 21 performs processing to generate a control signal for performing a display that notifies the driver of the current control state in a meter display section and output the generated control signal to a meter control unit (meter ECU) 43 that controls the meter display section.

As a result of the followed object selecting section 10, configured as described above, delay in judgment timing regarding the judgment of whether or not the own vehicle is following the leading vehicle, can be suppressed while maintaining judgment accuracy, by performing judgment based on the calculated expected cruising line, the position of the leading vehicle, and the probability map stored in advance.

The expected cruising line is determined based on the detection signals, such as that of the yaw rate of the own vehicle detected by the yaw rate sensor 32. In other words, the expected cruising line is determined as a curved line having differing curvatures based on the state of the road (lane) on which the own vehicle is traveling, such as whether or not the own vehicle is traveling on a curved road or the like. Therefore, even when the curvatures of the curved road differ or the like, deterioration of judgment accuracy regarding whether or not the own vehicle is following the leading vehicle can be suppressed.

The position of the leading vehicle is determined based on the detection signals (position signals) outputted from the radar sensor 31. The position is determined as a ground position with reference to the road surface or the ground. In addition, the above-described expected cruising line is also similarly determined as a ground line. Therefore, even when the detection timing of the position of the leading vehicle and the detection timing of the yaw rate of the own vehicle used to calculate the cruising line of the own vehicle differ, an error does not easily occur in the relative position relationship between the calculated position of the leading vehicle and the expected cruising line.

In the above-described probability map, the follow probability in relation to the offset amount that is the shortest distance from the expected cruising line to the position of the leading vehicle is set. In the probability map, the offset is the variable. The followed object setting section 14 performs the judgment processing regarding whether or not the own vehicle is following the leading vehicle using the follow probability set based on the above-described offset amount and is the probability map. Therefore, even when a difference is present between the expected cruising line and the actual curved road or the like, the judgment processing regarding whether or not the own vehicle is following the leading vehicle can be appropriately performed as a result of the above-described probability distribution. Deterioration of judgment accuracy can be suppressed. In addition, through use of the above-described probability distribution, deterioration of judgment accuracy can be suppressed even when the point at which the above-described judgment processing is performed is set far from the own vehicle.

As a result of the judgment processing being performed based on the cruising track of the leading vehicle and the latest expected cruising line, deterioration in accuracy of the judgment processing regarding whether or not the own vehicle is following the leading vehicle can be suppressed compared to when judgment processing is performed without use of the cruising track.

For example, an erroneous judgment that the own vehicle is following a vehicle that happens to be present in front of the own vehicle at the time while not traveling on the same lane as the own vehicle, such as a vehicle that is cutting across in front of the own vehicle, can be prevented. In addition, compared to a method in which an integrated value of the follow probability is calculated, the amount of calculation required for the judgment processing can be reduced and the time required for calculation can be shortened.

Regarding the range of the offset amount (predetermined range) at which the follow probability becomes relative high in the probability map, deterioration of accuracy of the judgment processing can be suppressed by narrowing the predetermined range in a probability map corresponding to a position relatively near the own vehicle, compared to that in a probability map corresponding to a position relatively far from the own vehicle. The above-described predetermined range can be set with reference to the vehicle width of the own vehicle or the leading vehicle, the width of the lane in which the own vehicle or the like is traveling, and the like.

In other words, when the own vehicle is following the leading vehicle, the distance between the expected cruising line and the cruising track of the leading vehicle (offset amount) is short at positions relatively near the own vehicle. On the other hand, when the own vehicle is not following the leading vehicle, the offset amount at the same positions increase. Therefore, as a result of the predetermined range being narrowed at positions relatively near the own vehicle, an erroneous judgment that the own vehicle is following the leading vehicle when the own vehicle is not following the leading vehicle can be suppressed.

In addition, the difference between the lane in which the own vehicle is traveling and the expected cruising line is large at positions relatively far from the own vehicle. Therefore, the offset amount often becomes large even when the own vehicle is following the leading vehicle. As a result of the above-described predetermined range being widened at positions relatively far from the own vehicle, an erroneous judgment that the own vehicle is not following the leading vehicle when the own vehicle is following the leading vehicle can be suppressed.

Furthermore, the predetermined range of the offset amount at which the follow probability is relatively high in the probability map may be changed depending on the curvature of the expected cruising line. In other words, the predetermined range when the curvature of the expected cruising line is large may be set to be wider than that when the curvature is small. As a result, even when the curvature is large and the difference between the lane in which the own vehicle is actually traveling and the expected cruising line is large, an erroneous judgment that the own vehicle is not following the leading vehicle even when the own vehicle is following the leading vehicle can be suppressed. Conversely, when the curvature of the expected cruising line is small, an erroneous judgment that the own vehicle is following the leading vehicle when the own vehicle is not following the leading vehicle can be suppressed.

Figure 12A:
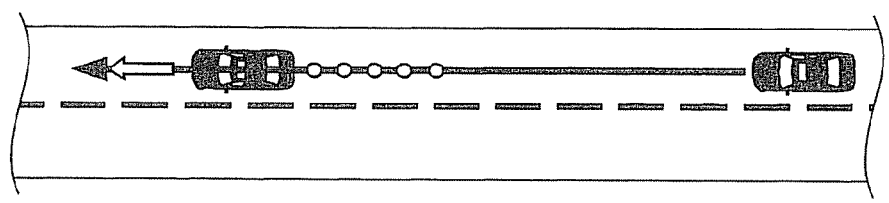
FIG. 12A and FIG. 12B are diagrams for describing a judgment processing timing for a leading vehicle traveling in a position far from the own vehicle.
Figure 12B:
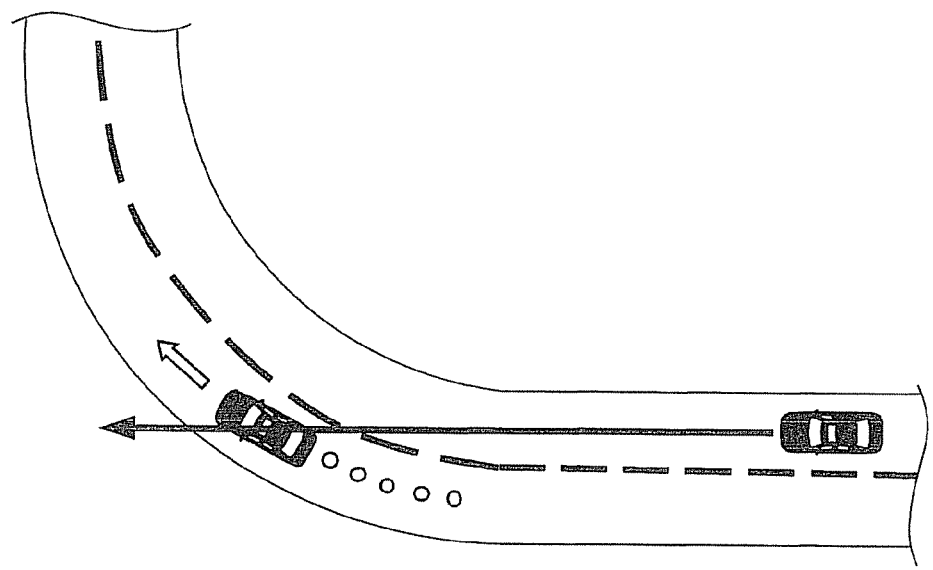

In addition, as shown in FIG. 12A and FIG. 12B, judgment processing can be performed regarding whether or not the own vehicle is following a leading vehicle that is traveling at a position far from the own vehicle. In other words, delay in the timing of the judgment processing can be suppressed.

In other words, in addition to the judgment processing being performed based on the cruising track of the leading vehicle and the latest expected cruising line, differentiation and identification of the states shown in FIG. 12A and FIG. 12B can be performed by the predetermined range in the probability map being narrowed at positions relatively near the own vehicle and widened at positions relatively far from the own vehicle. Furthermore, in the state shown in FIG. 12B, a judgment can be made that the own vehicle is not following the leading vehicle.

As a result of the expected cruising line including a transition curve, particularly the clothoid curve, the error between the lane in which the own vehicle is traveling and the expected cruising line can be reduced compared to when the expected cruising line does not include the clothoid curve. As a result, deterioration of accuracy of the above-described judgment processing can be suppressed. In other words, curved roads such as roads on which vehicles travel are often formed including clothoid curves that gradually change the curvature of the traffic lane. Therefore, as a result of the expected cruising line including clothoid curves, the occurrence of error between the cruising lane of the own vehicle and the expected cruising line can be suppressed.

In the inter-vehicular controller 1 configured as described above, the change in speed of the own vehicle performed to maintain the inter-vehicular distance between the own vehicle and the leading vehicle can be made gradual, compared to when the followed object selecting section 10, configured as described above, is not provided. In other words, delay in judgment timing regarding whether or not the own vehicle is following the leading vehicle can be suppressed. Therefore, time required for performing judgment of the inter-vehicular distance between the own vehicle and the leading vehicle and traveling speed control of the own vehicle can be easily ensured. As a result, the traveling speed of the own vehicle can be gradually changed.

A single kind of probability map may be used regardless of the traveling speed of the own vehicle. Alternatively, a plurality of probability maps based on the traveling speed of the own vehicle may be used. When a single kind of probability map is used, increase in the number of probability maps stored in the storage section 15 can be suppressed.

In addition, when a plurality of probability maps based on the traveling speed of the own vehicle are used, deterioration of accuracy of the judgment processing regarding whether or not the own vehicle is following the lead vehicle can be suppressed. In other words, when the traveling speed of the own vehicle is relatively fast, the own vehicle is often traveling on a road having a large number of curves having a small curvature suitable for high-speed travel, such as a highway. When the traveling speed is relatively slow, the own vehicle is often traveling on a road having curves having a large curvature, such as an ordinary street. For example, when the curvature of a curved road increases, the error between the traffic lane in which the own vehicle is traveling and the expected cruising line increases. Therefore, a probability map in which the spread of probability distribution is large is required to be used to judge that the own vehicle is following the leading vehicle when the own vehicle is following the leading vehicle.

Conversely, when the curvature of a curved road decreases, the error between the traffic lane in which the own vehicle is traveling and the expected cruising line decreases. Therefore, a probability map in which the spread of probability distribution is small is required to be used to judge that the own vehicle is not following the leading vehicle when the own vehicle is not following the leading vehicle. As a result, through selective use of the above-described kinds of probability maps depending on the traveling speed of the own vehicle, deterioration of accuracy of the judgment processing can be suppressed.

(Effects)

As described above, in an exemplary example of the leading vehicle detecting apparatus of the present invention, judgment is made based on the calculated expected cruising line, the position of the leading vehicle, and the probability map stored in advance. As a result, delay in timing of the judgment regarding whether or not the own vehicle is following the leading vehicle can be suppressed while making the judgment with high accuracy.

The expected cruising line is determined based on detection signals of the yaw rate of the own vehicle, the steering angle of the steering wheel, and the like detected by the state detecting section. In other words, the expected cruising line is determined as a curved line having different curvatures based on the state of the road on which the own vehicle is traveling, such as the own vehicle traveling on a curved road. Therefore, whether or not the own vehicle is following the leading vehicle can be accurately judged even when the curvatures in a curved road differ, and the like.

The position of the leading vehicle is determined based on position signals outputted from the position detecting section, such as a radar or a laser radar mounted in the own vehicle. The position is determined as a ground position with reference to the road surface or the ground. In addition, the expected cruising line is similarly determined as a ground line. Therefore, an error does not easily occur in the relative position relationship between the calculated position of the leading vehicle and the expected cruising line, even when the detection timing of the position of the leading vehicle and the detection timing of the state related to the cruising line of the own vehicle differ.

In the probability map, the follow probability in relation to the shortest distance from the expected cruising line to the position of the preceding vehicle is set. In other words, the probability distribution of follow probabilities of which the variable is the shortest distance is set. The calculating section performs the judgment processing regarding whether or not the own vehicle is following the leading vehicle using the above-described shortest distance and the follow probability set based on the probability map. Therefore, even when a difference is present between the expected cruising line and the actual curved road or the like, the judgment processing regarding whether or not the own vehicle is following the leading vehicle can be appropriately performed as a result of the probability distribution. Deterioration of judgment accuracy can be suppressed. In addition, as a result of the probability distribution being used, deterioration of accuracy of the judgment processing can be suppressed even when the point at which the judgment processing is performed is set to a position far from the own vehicle.

In the present invention, the storage section accumulates and stores therein the position signals of the leading vehicle that have been discretely acquired. When judging whether or not the own vehicle is following the leading vehicle based on the expected cruising line, the position signals and the probability map, the calculating section preferably determines the follow probabilities for the plurality of position signals, based on the plurality of position signals having differing elapsed times after acquisition, the expected cruising line calculated based on the detection signal acquired most recently, and the probability map. The calculating section then preferably judges whether or not the own vehicle is following the leading vehicle based on an aggregated probability that is an aggregation of the determined plurality of follow probabilities (the second aspect of the leading vehicle detecting apparatus).

As a result of the judgment processing being performed based on is the plurality of position signals having differing elapsed times after acquisition and the latest expected cruising line, deterioration of accuracy of the judgment processing regarding whether or not the own vehicle is following the leading vehicle can be suppressed, compared to when the judgment processing is performed using a single position signal.

The plurality of position signals having differing elapsed times after acquisition expresses, in other words, the cruising track of the leading vehicle. The judgment processing is performed using the cruising track of the leading vehicle, the latest expected cruising line, and the probability map. As a result, an erroneous judgment that the own vehicle is following a vehicle that happens to be only temporarily present in front of the own vehicle at the time while not traveling on the same lane as the own vehicle, such as a vehicle that is cutting across in front of the own vehicle, can be prevented.

A position signal having a long elapsed time after acquisition is a signal expressing a position at a point far from the leading vehicle (in other words, a point near the own vehicle). A position signal having a short elapsed time after acquisition is a signal expressing a position at a point near the leading vehicle (in other words, a point far from the own vehicle).

Compared to a method in which an integrated value of the follow probability is calculated based on the position signals of the leading vehicle that have been continuously acquired, the latest expected cruising line, and the probability map, the amount of calculation required for the judgment processing can be reduced and the time required for calculation can be shortened.

In the present invention, the probability map sets the follow probability relatively high when the distance from the expected cruising line to the position of the leading vehicle is within a predetermined range, and sets the follow probability relatively low when the distance exceeds the predetermined range. In the probability map corresponding to positional information of which the elapsed time after acquisition is relatively long, the predetermined range is preferably set to be narrower than that in the probability map corresponding to positional information of which the elapsed time after acquisition is relatively short (The third aspect of the leading vehicle detecting apparatus).

One may make a range in which the follow probability becomes relatively high in the probability map corresponding to positional information of which the elapsed time after acquisition is relatively longer narrower than that in the probability map corresponding to position information of which the elapsed time after acquisition is relatively short. By means of this, deterioration of accuracy of the judgment processing can be suppressed.

Here, the probability map corresponding to the positional information of which the elapsed time after acquisition is relatively short is, in other words, a probability map corresponding to a position relatively far from the own vehicle. The probability map corresponding to the positional information of which the elapsed time after acquisition is relatively long is, in other words, a probability map corresponding to a position relatively near the own vehicle.

When the own vehicle is following the leading vehicle, the distance (offset amount) between the expected cruising line and the cruising track of the leading vehicle becomes short at the position relatively near the own vehicle. On the other hand, when the own vehicle is not following the leading vehicle, the offset amount becomes large at the same position. As a result of the above-described predetermined range being narrowed at positions relatively near the own vehicle, an erroneous judgment that the own vehicle is following the leading vehicle even when the own vehicle is not following the leading vehicle can be suppressed.

At positions relatively far from the own vehicle, the difference between the traffic lane in which the own vehicle is travelling and the expected cruising line increases. Therefore, the offset amount often becomes large even when the own vehicle is following the leading vehicle. As a result of the above-described predetermined range being widened at positions relatively far from the own vehicle, an erroneous judgment that the own vehicle is not following the leading vehicle when the own vehicle is following the leading vehicle can be suppressed.

In the present invention, the storage section preferably stores in advance therein a plurality of kinds of probability maps based on the traveling speed of the own vehicle. The calculating section preferably selects the probability map adhering to the traveling speed of the own vehicle among the plurality of kinds of probability maps, based on an inputted signal of the traveling speed of the own vehicle. The calculating section then preferably judges whether or not the own vehicle is following the leading vehicle using the selected probability map (the fourth aspect of the leading vehicle detecting apparatus).

As a result of the probability map adhering to the traveling speed of the own vehicle being used as described above, deterioration of accuracy of the judgment processing can be suppressed. In other words, when the traveling speed of the own vehicle is relatively fast, the own vehicle is often traveling on a road having a large number of curves having a small curvature suitable for high-speed travel, such as a highway. When the traveling speed is relatively slow, the own vehicle is often traveling on a road having curves having a large curvature, such as an ordinary street. For example, when the curvature of a curved road increases, the error between the traffic lane in which the own vehicle is traveling and the expected cruising line increases. Therefore, a probability map in which the spread of probability distribution is large is required to be used to judge that the own vehicle is following the leading vehicle when the own vehicle is following the leading vehicle.

Conversely, when the curvature of a curved road decreases, the error between the traffic lane in which the own vehicle is traveling and the expected cruising line decreases. Therefore, a probability map in is which the spread of probability distribution is small is required to be used to judge that the own vehicle is not following the leading vehicle when the own vehicle is not following the leading vehicle. As a result, through selective use of the above-described kinds of probability maps depending on the traveling speed of the own vehicle, deterioration of accuracy of the judgment processing can be suppressed.

The expected cruising line calculated by the calculating section of the present invention preferably includes a transition curve. As a result of the expected cruising line including a transition curve in this way, the error between the traffic lane in which the own vehicle is traveling and the expected cruising line can be reduced compared to that when the expected cruising line does not include the transition curve. Deterioration of accuracy of the judgment processing can be suppressed. In other words, curved roads such as roads on which vehicles travel are often formed including transition curves, or more specifically, clothoid curves that gradually change the curvature of the traffic lane. Therefore, as a result of the expected cruising line including transition curves, and more preferably, clothoid curves, the occurrence of error between the cruising lane of the own vehicle and the expected cruising line can be suppressed.

According to an exemplary embodiment of the inter-vehicular control apparatus of the present invention, the inter-vehicular control apparatus is mounted in a vehicle and controls the distance between the own vehicle and a leading vehicle, when the own vehicle is following the leading vehicle traveling the same traffic lane as the own vehicle, among the vehicles traveling ahead of the own vehicle. The inter-vehicular control apparatus includes: i) the above-described leading vehicle detecting apparatus; and ii) a control section that controls the inter-vehicular distance to be within a predetermined range by controlling the traveling speed of the own vehicle based on the inter-vehicular distance from the leading vehicle that the leading vehicle detecting apparatus has judged the own vehicle to be following, to the own vehicle.

In the inter-vehicular control apparatus, the change in speed of the own vehicle performed to maintain the inter-vehicular distance between the own vehicle and the leading vehicle can be made gradual. In other words, delay in judgment timing regarding whether or not the own vehicle is following the leading vehicle is suppressed. Therefore, time required to perform subsequent judgment of the inter-vehicular distance between the own vehicle and the leading vehicle and traveling speed control of the own vehicle can be easily ensured. As a result, the traveling speed of the own vehicle can be gradually changed.

As described above, according to the exemplary embodiment of the leading vehicle detecting apparatus and the exemplary embodiment of the inter-vehicular control apparatus, as a result of the judgment based on the calculated expected cruising line, the position of the preceding vehicle, and the probability map stored in advance being performed, delay in judgment timing regarding whether or not the own vehicle is following the leading vehicle can be suppressed, while maintaining judgment accuracy.

What is claimed is:

1. A leading vehicle detecting apparatus that is mounted in an own vehicle and judges whether or not the own vehicle is traveling such as to follow a preceding vehicle traveling ahead of the own vehicle in a same traffic lane, the leading vehicle detecting apparatus including:
   a signal acquiring section that acquires both a position signal outputted from a position detecting device, which detects a position of the preceding vehicle, and a detected signal outputted from a state detecting device, which detects a state of a present cruising line in which the own vehicle is traveling;
   a storage section that stores in advance the position signal of the preceding vehicle that is discretely acquired and a probability map that assigns a probability regarding whether or not the own vehicle is following the preceding vehicle on the basis of a distance between an expected cruising line of the own vehicle and the position of the preceding vehicle at a plurality of different points within a predetermined period;
   a calculating section that calculates the expected cruising line of the own vehicle on the basis of the detection signal, determines the position of the preceding vehicle at the plurality of different points within the predetermined period on the basis of the position signal being a plurality of position signals differing in elapsed time after acquisition, and judges whether or not the own vehicle is following the preceding vehicle on the basis of the calculated expected cruising line of the own vehicle, the determined position of the preceding vehicle at the plurality of different points within the predetermined period, and the probability map; and
   one or more processors that are configured to pertain as the signal acquiring section, the storage section, and the calculating section, wherein the probability map is one or more graphs of an offset amount versus the probability, and the probability map associates a given offset with a respective probability, and the offset amount is an error between an approximated curve of a cruising track of the preceding vehicle and the expected cruising line of the own vehicle.

2. The leading vehicle detecting apparatus according to claim 1, wherein:

the storage section accumulates, and stores therein, the position signals of the preceding vehicle that have been discretely acquired;

the calculating section:

determines a follow probabilities for the plurality of position signals on the basis of i) the plurality of position signals having differing elapsed times after acquisition, ii) the expected cruising line calculated on the basis of the detection signal acquired most recently, and iii) the probability map when judging whether or not the own vehicle is following the preceding vehicle on the basis of the expected cruising line, the position signals and the probability map, and then judges whether or not the own vehicle is following the preceding vehicle on the basis of a combined probability that is calculated from the determined plurality of follow probabilities.

3. The leading vehicle detecting apparatus according to claim 2, wherein:

the probability map sets the follow probability relatively high when the distance between the expected cruising line and the position of the preceding vehicle is within a predetermined range, and sets the follow probability relatively low when the distance exceeds the predetermined range; and in the probability map corresponding to positional information of which the elapsed time after acquisition is relatively long, the predetermined range is set to be narrower than that in the probability map corresponding to positional information of which the elapsed time after acquisition is relatively short.

4. The leading vehicle detecting apparatus according to claim 3, wherein:

the storage section stores in advance therein a plurality of kinds of probability maps based on the traveling speed of the own vehicle; and the calculating section selects the probability map for the traveling speed of the own vehicle among the plurality of kinds of probability maps on the basis of an inputted signal of the traveling is speed of the own vehicle, and then judges whether or not the own vehicle is following the preceding vehicle using the selected probability map.

5. The leading vehicle detecting apparatus according to claim 2, wherein:

the storage section stores in advance therein a plurality of kinds of probability maps based on the traveling speed of the own vehicle; and the calculating section selects the probability map for the traveling speed of the own vehicle among the plurality of kinds of probability maps on the basis of an inputted signal of the traveling speed of the own vehicle, and then judges whether or not the own vehicle is following the preceding vehicle using the selected probability map.

6. The leading vehicle detecting apparatus according to claim 1, wherein the storage section stores in advance therein a plurality of kinds of probability maps based on a traveling speed of the own vehicle; and the calculating section selects the probability map for the traveling speed of the own vehicle among the plurality of kinds of probability maps on the basis of an inputted signal of the traveling speed of the own vehicle, and then judges whether or not the own vehicle is following the preceding vehicle using the selected probability map.

7. The leading vehicle detecting apparatus according to claim 1, wherein the expected cruising line calculated by the calculating section includes transition curves.

8. An inter-vehicular control apparatus that is mounted in an own vehicle and controls an inter-vehicular distance between the own vehicle and a preceding vehicle, when the own vehicle is following the preceding vehicle traveling in the same traffic lane as the own vehicle, among the vehicles traveling ahead of the own vehicle, the inter-vehicular control apparatus comprising:

i) a leading vehicle detecting apparatus that is mounted in the own vehicle and includes:

a signal acquiring section that acquires both a signal outputted from a position detecting section, which detects a position of the preceding vehicle, and a detected signal outputted from a state detecting section, which detects a state of a present cruising line in which the own vehicle is traveling;

a storage section that stores in advance the position signal of the preceding vehicle that is discretely acquired and a probability map that assigns a probability regarding whether or not the own vehicle is following the preceding vehicle on the basis of a distance between an expected cruising line of the own vehicle and the position of the preceding vehicle at a plurality of different points within a predetermined period; and a calculating section that calculates the expected cruising line of the own vehicle on the basis of the detection signal, determines the position of the preceding vehicle at the plurality of different points within the predetermined period on the basis of the position signal being a plurality of position signals differing in elapsed time since acquisition, and judges whether or not the own vehicle is following the preceding vehicle on the basis of the calculated expected cruising line of the own vehicle, the determined position of the preceding vehicle at plurality of different points within the predetermined period, and the probability map;

ii) a control section that is mounted in the own vehicle and controls the inter-vehicular distance to be within a predetermined range by controlling the traveling speed of the own vehicle on the basis of the inter-vehicular distance between the preceding vehicle and the own vehicle; and one or more processors configured to pertain as the leading vehicle detecting apparatus and the control section, wherein the probability map is one or more graphs of an offset amount versus the probability, and the probability map associates a given offset amount with a respective probability, and the offset amount is an error between an approximated curve of a cruising track of the preceding vehicle and the expected cruising line of the own vehicle.

9. A leading vehicle judging method for judging whether or not an own vehicle is traveling such as to follow a preceding vehicle traveling ahead of the own vehicle in a same traffic lane, the method including:

acquiring, by a leading vehicle detecting controller, both a position signal outputted from a position detecting device, which detects a position of the preceding vehicle, and a detected signal outputted from a state detecting device, which detects a state of a present cruising line in which the own vehicle is traveling, wherein the leading vehicle detecting controller is mounted in the own vehicle and includes one or more processors;

storing, by a storage section of the leading vehicle detecting controller, in advance the position signal of the preceding vehicle that is discretely acquired and a probability map that assigns a probability regarding whether or not the own vehicle is following the preceding vehicle on the basis of a distance between an expected cruising line of the own vehicle and the position of the preceding vehicle at a plurality of different points within a predetermined period;

calculating, by a calculating section of the leading vehicle detecting controller, the expected cruising line of the own vehicle on the basis of the detection signal;

determining, by the calculating section, the position of the preceding vehicle at the plurality of different points within the predetermined period on the basis of the position signal being a plurality of position signals differing in elapsed time after acquisition; and judging, by the calculating section, whether or not the own vehicle is following the preceding vehicle on the basis of the calculated expected cruising line of the own vehicle, the determined position of the second vehicle at the plurality of different points within the predetermined period, and the probability map, wherein the one or more processors are configured to pertain to the storage section and the calculating section of the leading vehicle detecting controller, the probability map is one or more graphs of an offset amount versus the probability, and the probability map associates a given offset amount with a respective probability, and the offset amount is an error between an approximated curve of a cruising track of the preceding vehicle and the expected cruising line of the own vehicle.

10. An inter-vehicular control method for controlling an inter-vehicular distance between an own vehicle and a preceding vehicle when the own vehicle is following the preceding vehicle traveling in the same traffic lane as the own vehicle among vehicles traveling ahead of the own vehicle, the method including:

acquiring, by a leading vehicle detecting apparatus mounted in the own vehicle, both a position signal outputted from a position detecting section, which detects a position of the preceding vehicle, and a detected signal outputted from a state detecting section, which detects a state of a present cruising line in which the own vehicle is traveling;

storing, by a storage section of the leading vehicle detecting apparatus, in advance the position signal of the preceding vehicle that is discretely acquired and a probability map that assigns a probability regarding whether or not the own vehicle is following the preceding vehicle on the basis of a distance between an expected cruising line of the own vehicle and the position of the preceding vehicle at a plurality of different points within a predetermined period;

calculating, by a calculating section of the leading vehicle detecting apparatus, the expected cruising line of the own vehicle on the basis of the detection signal;

determining, by the calculating section, the position of the preceding vehicle at the plurality of different points within the predetermined period on the basis of the position signal being a plurality of position signals differing in elapsed time after acquisition;

judging, by the calculating section, whether or not the own vehicle is following the preceding vehicle on the basis of the calculated expected cruising line of the own vehicle, the determined position of the preceding vehicle at the plurality of different points within the predetermined period, and the probability map; and controlling, by a control section mounted in the own vehicle, the inter-vehicular distance to be within a predetermined range by controlling the traveling speed of the own vehicle on the basis of the inter-vehicular distance between the preceding vehicle and the own vehicle, wherein one or more processors are configured to pertain as the leading vehicle detecting apparatus and the control section, the probability map is one or more graphs of an offset amount versus the probability, and the probability map associates a given offset amount with a respective probability, and the offset amount is an error between an approximated curve of a cruising track of the preceding vehicle and the expected cruising line of the own vehicle.

\* \* \* \* \*

UNITED STATES PATENT AND TRADEMARK OFFICE
CERTIFICATE OF CORRECTION

PATENT NO. : 9,061,590 B2
APPLICATION NO. : 13/713087
DATED : June 23, 2015
INVENTOR(S) : Jin Kurumisawa et al.

Page 1 of 1

It is certified that error appears in the above-identified patent and that said Letters Patent is hereby corrected as shown below:

In the Claims

Col. 19, line 3, claim 1, after "offset" insert --amount--;

Col. 19, line 51, claim 4, before "speed" delete "is";

Col. 20, line 18, claim 8, after "among" delete "the"; and,

Col. 20, line 23, claim 8, before "signal" insert --position--. (Second Occurrence)

Signed and Sealed this
Nineteenth Day of January, 2016

Michelle K. Lee
*Director of the United States Patent and Trademark Office*